E. W. RIEBETH.
SPRING WHEEL.
APPLICATION FILED SEPT. 7, 1920.
1,411,807.
Patented Apr. 4, 1922.
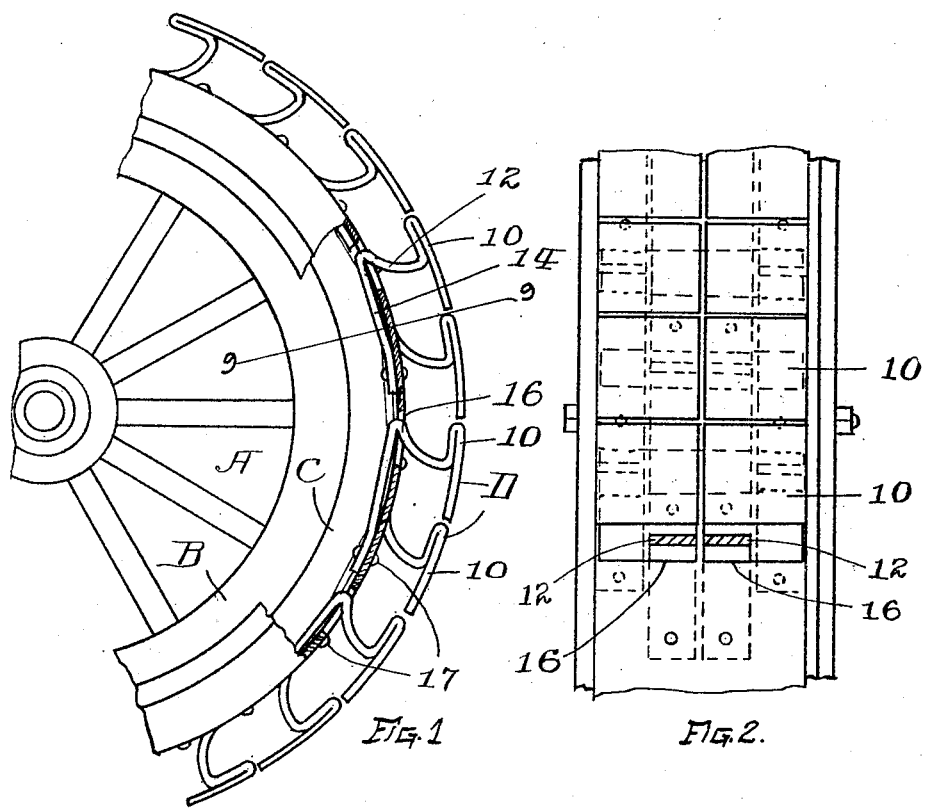
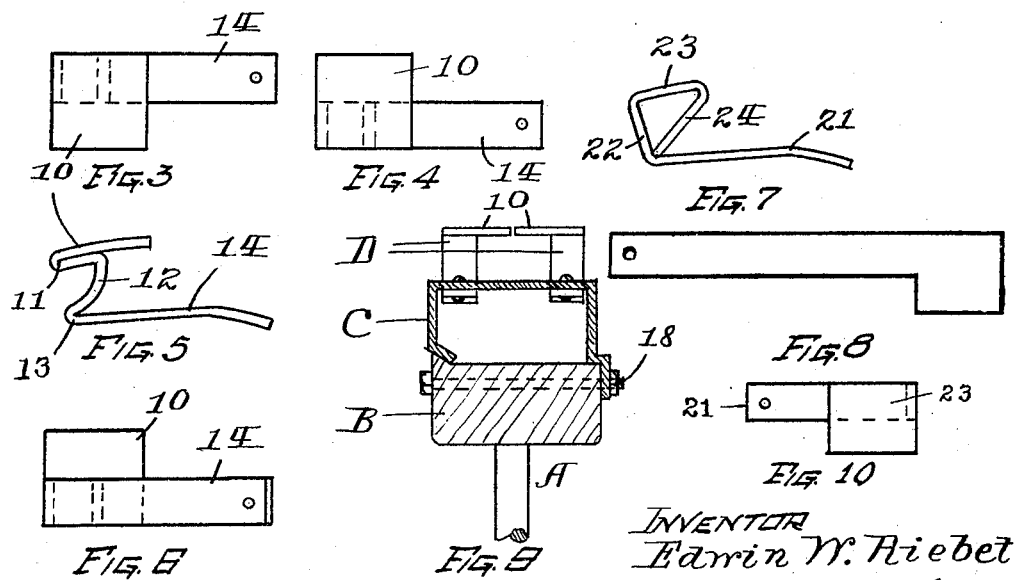

UNITED STATES PATENT OFFICE.

EDWIN W. RIEBETH, OF BILLINGS, MONTANA.

SPRING WHEEL.

1,411,807. Specification of Letters Patent. Patented Apr. 4, 1922.

Application filed September 7, 1920. Serial No. 408,444.

*To all whom it may concern:*

Be it known that I, EDWIN W RIEBETH, a citizen of the United States, residing in Billings, in the county of Yellowstone and State of Montana, have invented a new and useful Spring Wheel, of which the following is a specification.

My invention relates to improvements in spring wheels and more particularly to that class in which a spring tread is employed as distinguished from those in which the spring is applied to the spokes or to the hub of the wheel. The primary object of my invention is the production of a spring wheel having a maximum resiliency accompanied by maximum simplicity, inexpensiveness and durability. Further objects and advantages will be more fully set forth in the following specification.

In the accompanying drawings forming part of this specification: Figure 1 is a side elevation partly in section of part of a wheel showing the spring tread elements in place on the rim and their position when not sustaining weight of wheel or load; Fig. 2 is a plan of a portion of the structure shown in Fig. 1, showing the tread faces which are to run on the ground part of the structure being shown in section; Fig. 3 is a plan of one of the right or left hand spring tread elements detached from the wheel. looking directly at the tread face; Fig. 4 is a plan of one of the other companion spring tread elements also looking at the tread face; Fig. 5 is a side elevation of the spring tread element shown in Fig. 3; Fig. 6 is a plan of one of the spring tread elements looking directly at the base side, that is at the side opposite the tread; Fig. 7 is a side elevation of an alternative construction of spring member it being contemplated that various changes in design and configuration within the spirit of my invention may be made; Fig. 8 is a plan of the plate before it is bent into the spring tread member shown in Fig. 5 and Fig. 9 is a section taken on the line 9—9 of Fig. 1, and Fig. 10 is a plan of the spring tread member shown in Fig. 7, looking directly at the tread face.

My invention is applicable to a wheel of any suitable construction, one type A being shown in Fig. 1 having a solid felly B, and a hollow demountable rim C, to which my improved spring tread elements D are to be attached. Two complete circumferential series of tread elements D, situated closely but freely adjacent, are arranged on the wheel. Each spring element D is made out of a single piece of thin metal or other suitable material, formed with a broad, strong and rigid tread 10 of rectangular or other suitable shape, folded backwardly at 11 circumferentially of the wheel and curved radially inwardly and forwardly at the inner end of the fold and near the center of the tread to produce a strong and rigid supporting shank 12. The inner end of this shank is bent backwardly at 13 and formed with a long narrow spring support 14, which is rigidly secured against the inner surface of the rim C of the wheel. The support 14 performs the functions of a spring while the tread 10, shank 12 and portion of support 14 which is secured to the rim C are preferably rigid. The shank 12 being struck from the fold near the center of the tread distributes its supporting tendency evenly over the tread which is an advantage. The total width of the tread faces of two adjacent companion tread elements is less than the width of the rim but the width may be increased when desired to give greater supporting area and traction. The two spring treads of each longitudinal pair of elements are made right and left hand, the shanks being narrower than the treads to allow a passing unit to function freely and to distribute the tread faces evenly. Openings 16 of sufficient size through the periphery of the hollow rim are provided through which the shanks 12 of the spring elements are free to move inwardly and outwardly. These are two longitudinal series of these openings 16 situated side by side. As shown clearly in Fig. 2, the shank 12 of one tread of a series is disposed near the center of the rim while the next succeeding shank of a tread of the same series is disposed near a side of the rim. While two longitudinal series of openings 16 are shown, a single series may obviously be made of ample dimensions to accommodate the shanks of both series of treads. The shank of each spring tread being disposed with a flat side down and extending longitudinally along the rim produces a maximum lateral support to withstand lateral thrusts without straining and breaking. The supporting elements 14 of the spring treads are secured to the hollow rim by rivets 17, although it will be understood that any other suitable means may be employed for that purpose, bolts being more readily detachable. The hollow rim may resemble a circular housing or shell of any suitable construction and may be detachably secured over the solid felly by means of bolts 18 or other suitable means. Thus it will be observed the rim element C, with the tread elements mounted thereon, can be easily and quickly demounted from the wheel or adjusted thereon.

It will be noted that the tread elements are of normal, equal height and that a broad continuous resilient surface is produced. Only sufficient freedom is provided so that the tread elements pass one another on the rim of the wheel in such a manner that they are enabled to fully function without interference from one another. Each spring is free to bend to its full depth, due to its shape and answers as well the purpose of helping to make a continuous and full tread. This shape also makes it possible to get spring action of greater length and avoids the extreme lateral action and consequent unsatisfactory results which take place with the use of shorter springs. In other words my invention enables the tread surfaces to be set closer than in prior devices while at the same time providing a continuous or full tread, substantially direct spring action and greater freedom of action, avoiding what might be termed end thrust of the springs. In prior devices tread elements have been employed which are either set apart with a wide gap to allow freedom of action, thereby making an incomplete tread, or the tread elements overlap each other to make a complete but uneven tread and do not have freedom of action.

By placing the spring supports on the inner surface of the rim and arranging their shanks side by side through the rim, the wide circumferentially arranged treads have perfect freedom of action with no chance of interfering. The construction is also extremely simple and inexpensive and not likely to get out of order. The long spring leaf support and short rigid shank and rigid tread also are very efficient for the purposes intended. The feature of having the shanks pass through the rim assists in preventing mud and dirt from clogging the springs and reducing the efficiency of the spring tread elements, and the demountable rim feature facilitates repairing any broken parts or exchanging different styles or designs of treads constructed in accordance with my invention.

In Fig. 7 a modified construction of tread element is shown in which the shank is bent directly and radially inwardly of the wheel and formed at its inner end with a long spring support 21 at substantially right angles to the rigid radial portion 22. The tread face 23 on the outer end of the radial portion 22 also has an inturned end support 24. In this construction the spring element also has freedom of action as in the preferred form.

The width and shape of the tread portions, shanks, spring support and other portions of my spring elements may be varied within the scope of my invention without departing from the spirit thereof.

Having described my invention what I claim as new and desire to secure by Letters Patent is:

1. In combination with a wheel having a rim, a series of spring treads disposed circumferentially about said rim, each tread consisting of a thin plate formed with a broad and long longitudinal tread face folded backwardly to more evenly support said face bent inwardly from the inner end of the fold to produce a shank radiating outwardly of the wheel, and bent at the inner end of the shank to produce a longitudinal spring support secured to said rim and means for securing said support on said rim, the tread faces of said spring treads being independently movable and substantially concentric of the wheel and arranged close together to produce an even and freely resilient circumferential tread on the wheel.

2. In combination with a wheel having a rim, a series of spring treads disposed circumferentially about said rim, each tread consisting of a thin plate formed with a broad and long longitudinal tread face bent inwardly and inclined forwardly to produce a supporting shank and bent at the inner end of the shank to produce a longitudinal spring support, said shank passing through said rim and said support adapted to rest against the inner face of said rim and means for securing said support on said rim, the tread faces of said tread elements being evenly distanced outwardly from the periphery of the rim and arranged closely adjoining to produce an even and freely resilient circumferential tread surface on the wheel.

3. As a new article of manufacture, a spring tread element adapted to be mounted upon and carried by the rim of a wheel, consisting of a plate forming a long and wide tread surface, folded back, bent inwardly from the fold below the middle portion of the tread to produce a shank and bent longitudinally at the end of the shank farthest away from the tread element to produce a resilient supporting member.

4. As a new article of manufacture, a spring tread element adapted to be secured to the rim of a wheel, consisting of a plate forming a long and wide tread body forming an even tread surface throughout its area on said rim, said plate being folded inwardly at one end and bent away from the plate and forwardly at the inner end of the fold to produce a supporting shank for the tread body and the end of said shank farthest away from the plate being bent to produce a resilient support on the rim of the wheel.

5. As a new article of manufacture, a spring tread element adapted to be mounted upon and carried by the rim of a wheel, consisting of a plate having a wide tread portion and a narrow shank portion at only one side of the tread portion.

6. In combination with a wheel having a rim, two series of spring tread elements situated on said rim, each tread element of each series consisting of a plate having a narrow supporting portion secured to said rim and a wide tread portion, said spring tread elements being arranged in pairs side by side on said rim and said narrow supporting portions being in staggered arrangement to facilitate positioning the tread.

7. In combination with a wheel having a rim, said rim having a plurality of openings outwardly therethrough, two series of spring tread elements situated on said rim, each tread element of each series consisting of a plate having a long narrow spring leaf supporting portion secured within said rim, a short rigid shank on a free end of said supporting portion passing freely through one of said openings in said rim and a broad tread portion carried on the outer end of said shank, said narrow supporting portions being arranged in pairs side by side on said rim and the tread portions of each pair of supporting portions being arranged side by side.

8. In combination with a wheel having a rim, said rim having a plurality of openings outwardly therethrough, a plurality of tread elements on said rim each tread element consisting of a plate having a long narrow spring leaf supporting portion secured within said rim a short rigid shank on the free end of said supporting portion passing freely through one of said openings in said rim and a broad tread portion carried on the outer end of said shank.

9. In combination with a wheel having a rim, said rim having a plurality of openings outwardly therethrough and a plurality of tread elements, each tread element having a tread portion outwardly from the rim, a spring support mounted within said rim and a shank connecting said spring support and tread portion, said shank passing freely through one of said openings.

10. In combination with a wheel having a felly and a ring demountably mounted on said felly, said rim having a plurality of openings outwardly therethrough, and a plurality of tread elements each consisting of a plate having a spring supporting portion secured to the inner surface of said rim adjacent to one of said openings, a rigid shank on the outer end of said spring portion and passing freely through said adjacent opening, and a tread portion on the outer end of said shank the tread portions on said shanks being arranged circumferentially in close series formation.

In testimony whereof, I have signed my name to this specification.

EDWIN W. RIEBETH.